US010693849B2

United States Patent
He et al.

(10) Patent No.: US 10,693,849 B2
(45) Date of Patent: Jun. 23, 2020

(54) SENDING MESSAGE IN MULTILAYER SYSTEM

(71) Applicant: INTERNATIONAL BUSINESS MACHINES CORPORATION, Armonk, NY (US)

(72) Inventors: Miao He, Beijing (CN); Chang Rui Ren, Beijing (CN); Bing Shao, Beijing (CN); Yue Tong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 15/813,284

(22) Filed: Nov. 15, 2017

(65) Prior Publication Data

US 2019/0149526 A1 May 16, 2019

(51) Int. Cl.
*H04L 29/06* (2006.01)
*H04L 9/14* (2006.01)
(Continued)

(52) U.S. Cl.
CPC ........ *H04L 63/0442* (2013.01); *G06F 21/602* (2013.01); *G06F 21/606* (2013.01); *H04L 9/0643* (2013.01); *H04L 9/0894* (2013.01); *H04L 9/14* (2013.01); *H04L 9/3247* (2013.01); *H04L 9/0825* (2013.01); *H04L 9/3236* (2013.01)

(58) Field of Classification Search
CPC ..... H04L 63/0442; H04L 9/14; H04L 9/0825; H04L 9/3236; G06F 21/602
See application file for complete search history.

(56) References Cited

U.S. PATENT DOCUMENTS 9,215,076 B1 * 12/2015 Roth ..................... H04L 9/3247
9,369,445 B2 * 6/2016 Mahajan ............. H04L 63/0428
(Continued)

FOREIGN PATENT DOCUMENTS

CN 104468614 A 3/2015
GB 201413284 9/2014
(Continued)

OTHER PUBLICATIONS

Christidis et al., "Blockchains and Smart Contracts for the Internet of Things", IEEE Access, Special Section on the Plethora of Research in Internet of Things (IoT), vol. 4, May 10, 2016, pp. 2292-2303.

(Continued)

*Primary Examiner* — Joseph P Hirl
*Assistant Examiner* — Stephen T Gundry
(74) *Attorney, Agent, or Firm* — Michael A. Petrocelli

(57) ABSTRACT

A computer-implemented data transmission method and system are provided. A first transformed password (PWD) is acquired from the first node, wherein the first transformed PWD is derived from an original PWD. An encrypted message is acquired from the first node, the encrypted message being encrypted with a public key of the first node. A private key of the first node is recovered according to the first transformed PWD, the private key having been encrypted with the first transformed PWD and stored in the second node in advance. The encrypted message is decrypted with the recovered private key to obtain a decrypted message for processing.

20 Claims, 11 Drawing Sheets

(51) Int. Cl.
   *G06F 21/60* (2013.01)
   *H04L 9/08* (2006.01)
   *H04L 9/32* (2006.01)
   *H04L 9/06* (2006.01)

(56) References Cited

U.S. PATENT DOCUMENTS

| | | | |
|---|---|---|---|
| 9,571,462 B1* | 2/2017 | Kuzmenko | H04L 63/0428 |
| 9,577,995 B1* | 2/2017 | Kuzmenko | H04L 63/061 |
| 9,729,524 B1* | 8/2017 | Brandwine | H04L 63/0457 |
| 10,129,223 B1* | 11/2018 | Bhattacharyya | H04L 9/14 |
| 10,263,969 B2* | 4/2019 | Hwang | H04L 63/061 |
| 10,389,533 B2* | 8/2019 | Le Saint | H04L 9/0841 |
| 10,396,987 B2* | 8/2019 | Leavy | H04L 9/0844 |
| 10,425,223 B2* | 9/2019 | Roth | H04L 9/0836 |
| 2009/0307495 A1* | 12/2009 | Matsuo | H04L 9/002 713/171 |
| 2015/0134962 A1* | 5/2015 | Mahajan | H04L 63/0428 713/171 |
| 2015/0379510 A1 | 12/2015 | Smith | |
| 2016/0044034 A1* | 2/2016 | Spilman | G06F 21/602 713/181 |
| 2016/0119143 A1* | 4/2016 | Fang | G06F 21/32 713/186 |
| 2016/0294794 A1* | 10/2016 | Mancic | H04L 63/061 |
| 2016/0330177 A1* | 11/2016 | Singleton, IV | G06F 21/6209 |
| 2016/0358169 A1 | 12/2016 | Androulaki et al. | |
| 2017/0180380 A1* | 6/2017 | Bagasra | H04L 63/101 |
| 2017/0187528 A1* | 6/2017 | Camenisch | H04L 9/0844 |
| 2017/0277905 A1* | 9/2017 | Bjorg | G06F 21/6218 |
| 2017/0359317 A1* | 12/2017 | Anderson | H04L 63/0471 |
| 2018/0026787 A1* | 1/2018 | Le Saint | H04L 9/0861 713/155 |
| 2018/0137512 A1* | 5/2018 | Georgiadis | G06Q 20/065 |
| 2018/0191498 A1* | 7/2018 | Murray | G06F 7/725 |
| 2018/0212772 A1* | 7/2018 | Leavy | H04L 9/0863 |
| 2018/0270051 A1* | 9/2018 | Roth | G06F 21/602 |
| 2018/0295134 A1* | 10/2018 | Gupta | H04L 63/10 |
| 2019/0182044 A1* | 6/2019 | Mullen | H04L 9/3247 |
| 2019/0207912 A1* | 7/2019 | Nielson | H04L 9/3263 |
| 2019/0245682 A1* | 8/2019 | Alwen | H04L 9/0822 |
| 2019/0268149 A1* | 8/2019 | Kariv | H04L 9/0897 |

FOREIGN PATENT DOCUMENTS

| | | | | |
|---|---|---|---|---|
| WO | | 2013056502 A1 | 4/2013 | |
| WO | WO-2013157957 A1 * | | 10/2013 | G06F 21/62 |

OTHER PUBLICATIONS

Disclosed Anonymously, "Protocol for Enabling Secure Smart Home Network Communication in IoT", IP.com Prior Art Database Technical Disclosure, IP.com No. IPCOM000247757D, Publication Date: Oct. 6, 2016, pp. 1-5.

Lin et al., "IoT Privacy and Security Challenges for Smart Home Environments", MDPI Article, Information 2016, vol. 7, No. 44, Jul. 13, 2016, 15 pages.

Mell et al., "The NIST Definition of Cloud Computing", Recommendations of the National Institute of Standards and Technology, Special Publication 800-145, Sep. 2011, 7 pages.

\* cited by examiner

SENDING MESSAGE IN MULTILAYER SYSTEM

BACKGROUND

In the complicated business environment and an era of digitalization, it is very common that various messages may be transferred sequentially through multiple layers to achieve a business purpose. The prolonged chain with multiple parties causes two concerns: 1) the mutual parties may not trust each other; 2) the longer the chain is, the more likely that a malicious attacker will pretend to be one of the parties and bring trouble.

To address the concerns, all the messages may be transferred under a "https" like protocol AND a third CA institution is required to issue a certificate to each device. However, one disadvantage may be that paying the certificate fee for so many devices is not economic, and another disadvantage may be that the "https" like protocol requires several rounds of communication which is time consuming.

In some scenarios, the transmission and authentication should be automatically performed. Therefore, a signature may be verified in each node of the multilayer system and each node may hold a private key in cleartext for verifying the signature. That is, each time a node receives a message, the node will verify the signature of the sender. After verifying, the node may sign its own message and dispatch the message to the next node. One disadvantage of this kind of solution may be that a cleartext private key, stored at the node which uses the private key, makes the node vulnerable to attack. It is because a hacker can easily get the private key of each node and may change the content of all the messages and sign the changed messages with the hacked private key. However, if the cleartext private key were not stored at the node for executing the signing process, the process could not be executed automatically.

Therefore, how to enhance user authentication experience in the multi-layer system, such as how to achieve automation while ensuring security, is a challenge in modern days.

SUMMARY

Example embodiments of the present disclosure provide a new approach for enhancing user authentication experience for sending message in a multilayer system.

In an aspect, a computer-implemented data transmission method executed at a second node is provided, wherein the second node is communicatively connected to a first node. According to the method: A first transformed password (PWD) is acquired from the first node, wherein the first transformed PWD is derived from an original PWD. An encrypted message is acquired from the first node, the encrypted message being encrypted with a public key of the first node. A private key of the first node is recovered according to the first transformed PWD, the private key having been encrypted with the first transformed PWD and stored in the second node in advance. The encrypted message is decrypted with the recovered private key to obtain a decrypted message for processing.

In another aspect, a computer system is provided, the computer system is a second node that being communicatively connected to a first node. The system comprising: a processor, a computer-readable memory coupled to the processor, the memory comprising instructions that when executed by the processor perform actions. The instructions may be executed by the processing unit to perform actions. According to the actions: A first transformed password (PWD) is acquired from the first node, wherein the first transformed PWD is derived from an original PWD. An encrypted message is acquired from the first node, the encrypted message being encrypted with a public key of the first node. A private key of the first node is recovered according to the first transformed PWD, the private key having been encrypted with the first transformed PWD and stored in the second node in advance. The encrypted message is decrypted with the recovered private key to obtain a decrypted message for processing.

In yet another aspect, a computer program product is proposed. The computer program product being tangibly stored on a non-transient machine-readable medium and comprising machine-executable instructions, the instructions, when executed on a second node, wherein the second node is communicatively connected to a first node, causing the second node to perform acts. According to the acts: A first transformed password (PWD) is acquired from the first node, wherein the first transformed PWD is derived from an original PWD. An encrypted message is acquired from the first node, the encrypted message being encrypted with a public key of the first node. A private key of the first node is recovered according to the first transformed PWD, the private key having been encrypted with the first transformed PWD and stored in the second node in advance. The encrypted message is decrypted with the recovered private key to obtain a decrypted message for processing.

Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Figure 1:
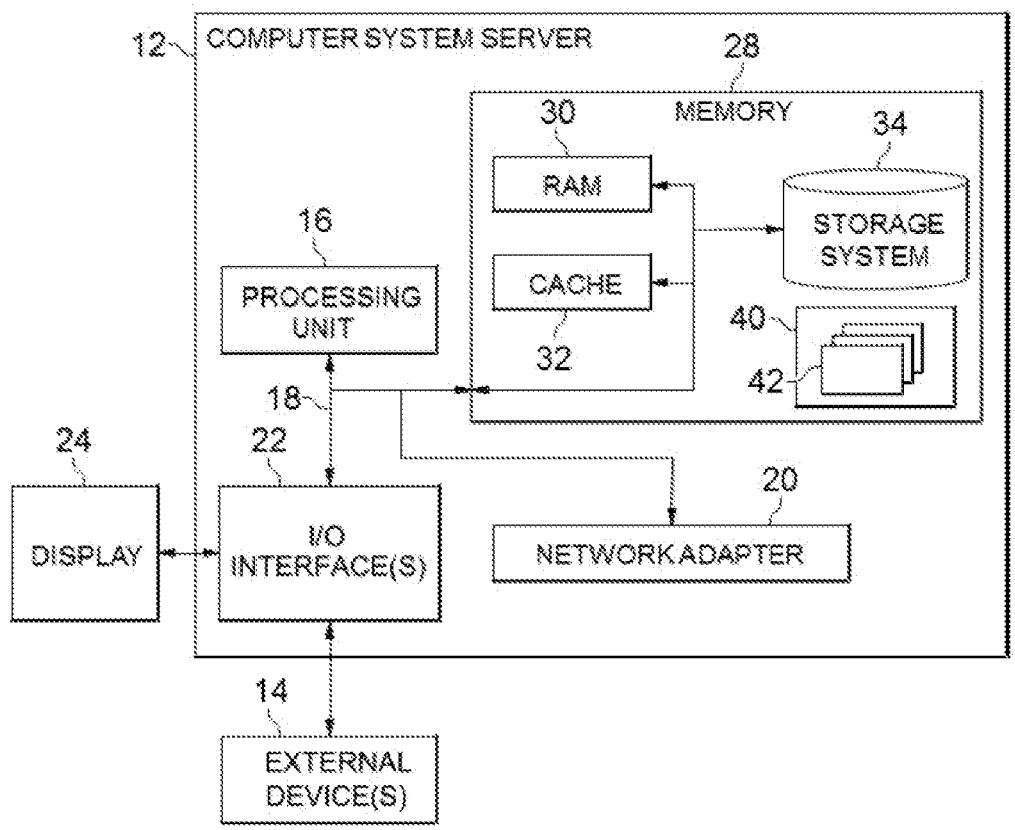
FIG. 1 is a block diagram illustrating a device suitable for implementing embodiments of the present disclosure.

Referring now to FIG. 1, in which an exemplary computer system/server 12 which is applicable to implement the embodiments of the present invention is shown. FIG. 1 is also adapted to depict an illustrative example of a portable electronic device such as a communication device which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 2:
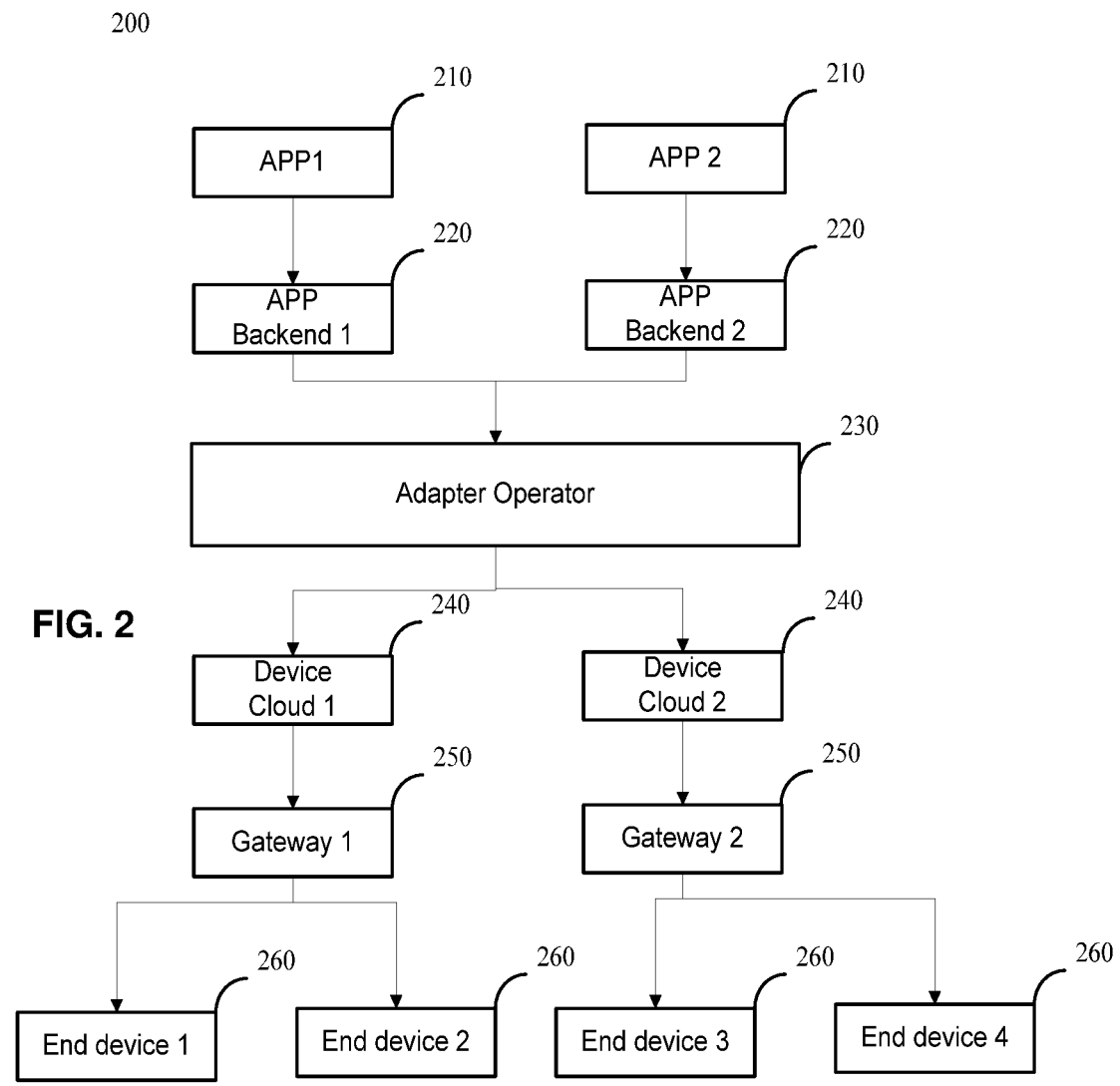
FIG. 2 shows an example diagram of a multilayer system for sending information in accordance with exemplary embodiments of the present disclosure.

FIG. 2 shows an example diagram of a multilayer system 200 for data transmission in accordance with exemplary embodiments of the present disclosure.

In one embodiment, the multilayer system 200 may have multiple layers communicatively connected sequentially, each layer comprising at least one node. At least one user may be communicated with at least one end device via the multilayer system. In one scenario, the at least one user may send a message downward to the at least one end device to control the at least one end device. In another scenario, the at least one end device may send a message upward to users, the message may be used to feedback information from the at least one end device to the users.

In one embodiment, the multilayer system 200 comprises but not limited to APP 210, APP backend 220, Adapter Operator 230, Device clouds 240, Gateways 250, and end devices 260. Each of these nodes will be further described in the following paragraphs.

APP 210 provide an interface for controlling end devices 260 to realize integrated and complex functions. In another embodiment, the APP 210 may send controlling message to a concerned end device, the controlling message may indicate any kind of action to be executed by the end devices, for example, closing a window or switching on an air conditioner.

APP backend 220 support complicated calculation of business logic and data storage for APP 210. In one embodiment, the APP backend 220 is a server that host the APP 210. The APP 210 and APP backend 220 may be residing in the same physical or virtual computing device or may be separated and reside in different physical or virtual computing device.

Adapter Operator 230 may provide same interface to the APP 210 and hide the heterogeneous interfaces for the devices from different manufacturers an adapter operator may serve as an interpreter to translate a message coming from the APP into a translated message specific to a device cloud. In one embodiment, Adapter Operator 230 may be a cloud service to translate an application-specific language into a device-specific language. Therefore, via service from adapter operator, different application may interchange message with different device cloud, and the interchanged message will be understood by different device cloud that serves devices from different manufactures.

The device cloud 240 is usually a cloud service provided by a manufacturer for serving IoT devices produced by the manufacturer. To be specific, the device cloud may work as interpreter to interpret the translated message from adapter operator or provide other data transformation/services provided by the specific device manufacturer.

Gateway 250 will also be included in this system, which is installed in the user's home to make the device to execute the command of the user. It is also used to connect the end device to the network.

End devices 260 may be any kinds of devices to be controlled by users. Since more and more end devices are being connected to networks, the connected end devices become vulnerable to remote attack. End devices 260 may be any kinds of IOT devices, and may be produced by different manufacturers. Smart homes instrumented with multiple sensors/actuators are increasingly appearing. Therefore, sensor will be taken as an exemplary implementation of the end device for describing the present invention. However, the invention should not be construed to be limited to the embodiments disclosed herein.

Take the control of smart home as an example to illustrate the operation of the system in FIG. 2. When a user sends a message to the application server 220 via his/her application 210 in the phone, the application server 220 further sends the control message to some adaptor's cloud 230 to translate the application-specific language into the device-specific language. The device-specific language will be sent to the device cloud 240 provided by the manufacturer of the IoT device, and the device cloud 240 will further send it to the gateway 250 installed in the user's home to make the end device 260 to execute the command of the user.

Because the message may travel a very long distance before reaching the destination end device, how to ensure its security is an important issue, especially when multiple nodes, such as the APP provider, adapter operator and gateway, involved in the transmission of information belong to different providers. That is to say, the multiple nodes illustrated in FIG. 2 can't trust each other, thus, the connected end devices becomes vulnerable to remote attack.

It is noted that, the details of the implementation of how to achieve automation and security in the meantime in a multi-layer system will be described with reference to a smart home scenario, but it's applicable to all systems in which a message must travel through a multilayer system.

Figure 3:
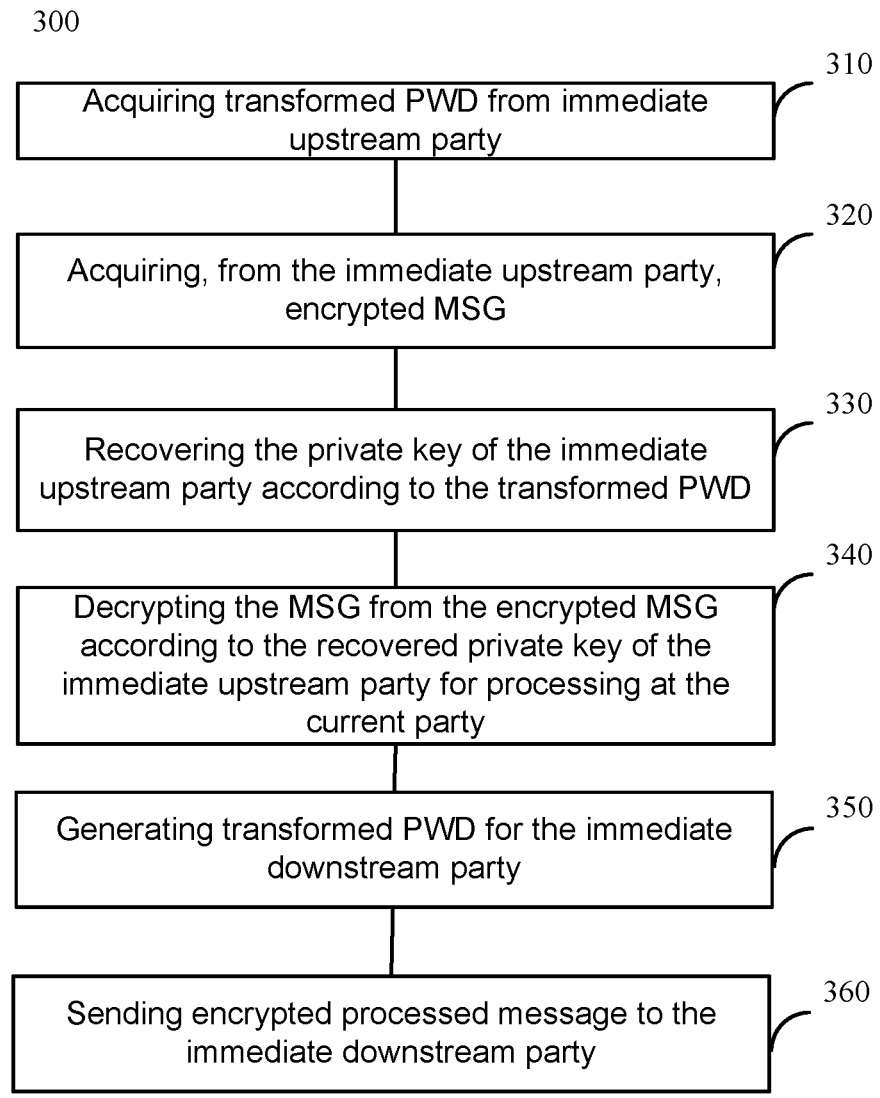
FIG. 3 shows a flow diagram of a computer-implemented method used in a current party for sending message in accordance with exemplary embodiments of the present disclosure.

FIG. 3 shows a flow diagram of a computer-implemented data transmission method 300 executed at a second node in accordance with exemplary embodiments of the present disclosure, wherein the second node is communicatively connected to a first node.

In one embodiment, a multilayer system comprises the first node at a first layer which is communicatively connected to the second node at a second layer. The multilayer system may also comprise a third node at a third layer which is communicatively connected to the second node. And thus, multiple nodes that belong to different layers may be interconnected and multiple information transmission chains may be formed. The method may be executed at the second node. In another embodiment, the first node, the second node and the third node may be at a same layer, but for sake of easy description, the present invention will be described with reference to the embodiment that the three nodes being at different layers.

In one embodiment, the multilayer system may comprise a chain of multiple nodes consisting of, application 210, application backend 220, Adaptor Operator 230, device cloud 240, gateway 250 and end device 260 communicatively connected sequentially. Each one of the chains may be regarded as an information transmission path for a user communicate with a specific end device concerned by the user. And then, and the second node is any one of the application backend 220, the Adaptor Operator 230, the device cloud 240, the gateway 250. In one embodiment, the method of FIG. 3 may be applied one specified second node of one chain.

The method 300 start from step 310, but before the execution of method 300, at least one node in an information transmission chain may be prepared with a predetermined encryption parameter for password transforming, and a pair of private key and public key. According to an embodiment of the invention, the parameter and the keys may be prepared via a registration process in which the multilayer system may be initialized and prepared with necessary information for the data transmission. Details of the registration process will be described later with reference to FIG. 6, FIG. 7 and FIG. 8.

Since different node may represent different parties, then, in one embodiment, the second node represent a current party, the first node represents an immediate upstream party that is communicatively connected to the current party, and similarly, the third node represent an immediate downstream party that is communicatively connected to the current party. And thus, for sake of easy description and easy to understand later, the first node, the second node and the third node may be represented by the immediate upstream party, the current party and the immediate downstream party respectively.

Next, the method 300 will be executed at a specific embodiment of the second node, i.e. the current party, which has an immediate upstream party and an immediate downstream party in a multilayer system. However, the technical person in the art understand that the first node, the second node and the third node should not be limited by the specific embodiment herein.

In step 310, a first transformed password (PWD) may be acquired from the immediate upstream party. In one embodiment, the transformed PWD may be derived from an original PWD input by the user. In another embodiment, the original PWD may be of any format, such as numbers, characters, or finger print etc.

In one embodiment, a specific parameter associated with the immediate upstream party may be used for deriving the first transformed PWD from the original PWD; for example, by using some hashing algorithm, an original PWD may be mapped to a first transformed PWD. The skilled person in the art may appreciate that other similar methods may be employed to derive a transformed PWD from an original PWD.

In step 320, an encrypted message being encrypted with a public key of the immediate upstream party may be acquired from the immediate upstream party. For example, the encrypted message may be E(msg, pubK$_a$), or E(msg, pubK$_{ab}$) shown in FIG. 4. And thus, the message travelling downward may be encrypted with the next destination's public key such that no middleman attack can capture the message formats or contents. In an alternative embodiment, the message travelling upward may also be encrypted with the next destination's public key.

In step 330, the private key of the immediate upstream party may be recovered according to the first transformed PWD, wherein, the private key of the immediate upstream party has been encrypted with the first transformed PWD and stored in the current party in advance. In one example, the private key of the immediate upstream party may be a private key generated for the immediate upstream party. In another example, the private key of the immediate upstream party may be a private key generated in association with a chain from a specific user to the current party, details of which will be described later with reference to FIG. 9.

In step 340, the message may be decrypted from the encrypted message with the recovered private key to obtain a decrypted message for processing at the current party. The processing of the decrypted message may be depended on the individual current parties. In other words, one current party may process a decrypted message in a way differently from another current party. It is to be noted that the present invention does not reside on how a decrypted message is processed by a current party, but on how the message is encrypted and transferred. Therefore, details of the processing of decrypted messages will be omitted herein for conciseness.

In step 350, a second transformed PWD for the immediate downstream party may be generated based on the first transformed PWD.

In one embodiment, a specific parameter associated with the current party may be used for generating the second transformed PWD based on the first transformed PWD by hashing, for example, the first transformed PWD is the input for a one-way hashing function which outputs the second transformed PWD. In one specific embodiment, the encryption parameter may be a salt value, which is a random data that is used as an input in addition to the first transformed PWD for the one-way hashing function.

It is to be noted that, in one embodiment of the present invention, since each party only knows its associated encryption parameters for generating a transformed PWD, the transformed PWD may be further used for the next party to decrypt private key corresponding to the party, therefore, automaticity of the chained data transmission at a high level of security may be obtained, that is, the downward message or the upward messages may be travelled automatically except for the original password that needs to be input by the user manually.

In step 360, the encrypted processed message, which is the processed message encrypted with public key of the current party, may be sent to the immediate downstream party.

The above-mentioned steps 310 to 360 are not limited to a specific current party. Next, the implementation of each of the steps will be described with reference to FIG. 4.

Figure 4:
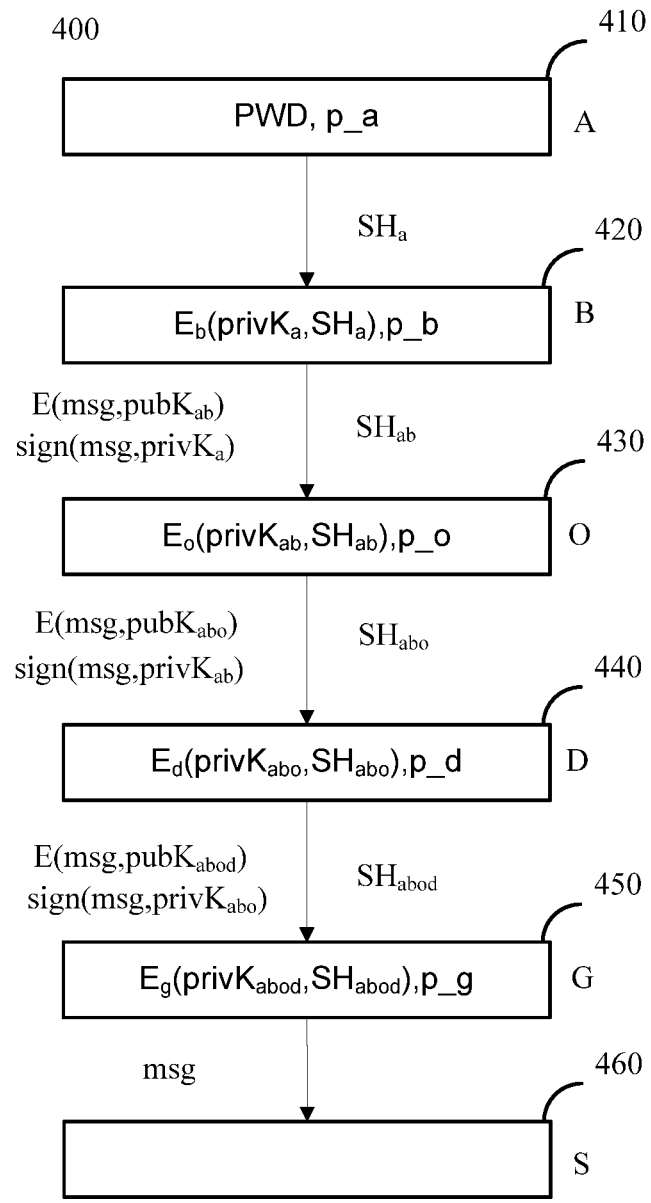
FIG. 4 Shows an example diagram for sending message downward in accordance with embodiments of the present disclosure.

FIG. 4. shows an example diagram 400 for sending a message downward in accordance with an embodiment of the present disclosure. The message may be passed through several nodes shown in FIG. 4, such as APP backend 420, adapter operator 430, device cloud 440 and gateway 450. Now exemplary embodiments will be described in detail with reference to several embodiments corresponding to different given current parties respectively as the following.

In a first embodiment, the current party in FIG. 3 may be implemented as APP backend 420, denoted by B in FIG. 4. Then the immediate upstream party may be APP 410, denoted by A in FIG. 4, used by a user "a". A specific parameter p_a may be used for party A to transform, for example slow hash, an inputted PWD into a first transformed PWD, denoted by SH$_a$ in FIG. 4. The skilled person in the art may adopt other kinds of transformed PWD that derived from an original PWD inputted by the user. And then, the steps 310-360 in FIG. 3 may be applied to the specified current party and implemented as below:

In the step 310, the current party APP backend B acquires the first transformed PWD SH$_a$ from the immediate upstream Party A 410.

In the step 320, an encrypted message E(msg, pubK$_a$) may be acquired from the immediate upstream party A, wherein "msg" and "pubK$_a$" means that the encrypted message is generated by encrypting a message, msg, with a public key, pubK$_a$, of the immediate upstream Party A 410.

In the step 330, a private key of the immediate upstream Party A 410, represented by privK$_a$, may be recovered according to the transformed PWD SH$_a$. As described above, privK$_a$ has been encrypted with SH$_a$ and prestored in party B as E$_b$(privK$_a$,SH$_a$). So long as SH$_a$ is acquired, privK$_a$ may be recovered accordingly.

Next, in the step 340, the encrypted message may be decrypted with the recovered privK$_a$ for further processing at the current party B.

Then, in the step 350, SH$_{ab}$ may be generated as the second transformed PWD, at the current party B 420, for the immediate downstream party, that is, SH$_{ab}$ is also derived from SH$_a$ based on an encryption parameter specified to the APP backend B 420. In one example, Party B may have a specified parameters p_b using for hashing SH$_a$ into SH$_{ab}$, then, the generated SH$_{ab}$ may be sent to immediate downstream party. In one specific embodiment, the encryption parameter is salt value, which is a random data that is used as an additional input to a one-way function that hashes a password.

And then, in the step 360, after the message has been processed in the current party B 420, the processed message may be encrypted with public key of the current party, and then, the encrypted message may be sent to the immediate downstream party, for example, if the immediate downstream party is party O 430 in FIG. 4, then the encrypted message sent to party O 430 may be E(msg, pubK$_{ab}$), as shown in FIG. 4.

In a further embodiment, step 370 and 380 may be included for signing operation. To be specific, the APP backend B 420 may also sign the processed message to ensure that the processed message is really send from a specific user "a" of the APP, the detail of the signing steps may be described as below:

In step 370, sign (msg, privK$_a$) may be generated as the signed message, which is the decrypted message signed with the private key privK$_a$ that recovered from current party B. To be specific, the private key privK$_a$ is recovered according to SH$_a$ from the encrypted message E$_b$(msg, privK$_a$) that stored in party B in advance.

In step 380, the generated signed message may be sent to immediate downstream party for verifying the authenticity of the signed message, for example, sign (msg, privK$_a$) may be used for verifying the authenticity of the signed message.

In a second embodiment, the current party may be the adapter operator 430, denoted by "O" in FIG. 4. Then the immediate upstream party is the APP backend 420, denoted by "B" in FIG. 4. Party O may also have a specified parameters p_o using for transforming the first transformed PWD, for example the acquired $SH_{ab}$, into a second transformed PWD, for example the $SH_{abo}$ generated in party O. Therefore, the steps 310-360 in FIG. 3 may be applied to the specified current party and implemented as below:

In step 310, $SH_{ab}$ may be acquired by the current party O 430 from the immediate upstream party B 420 as the first transformed PWD.

In step 320, the encrypted message $E(msg, pubK_{ab})$ may be acquired from the immediate upstream party B 420, wherein the notation $E(msg, pubK_{ab})$ represents that the message is encrypted with public key of the immediate upstream party B 420.

In step 330, $privK_{ab}$ may be recovered according to the transformed PWD, the $privK_{ab}$ representing private key of the immediate upstream party B. As described above, $privK_{ab}$ has been encrypted with $SH_{ab}$ and being prestored in party O as $E_o(privK_{ab}, SH_{ab})$. So long as $SH_{ab}$ is acquired, $privK_{ab}$ will be recovered accordingly.

In step 340, the message may be decrypted from the encrypted message $E(msg, pubK_{ab})$ according to the recovered private key $privK_{ab}$ of the immediate upstream party B 420 for processing at the current party O 430. In this embodiment, the current party is adapter operator, thus the processing may include some regular processing that an adapter operator usually performs.

In step 350, a transformed PWD $SH_{abo}$ may be generated as the second transformed PWD, at the current party O, for the immediate downstream party. That is to say, $SH_{abo}$ is also derived from $SH_a$ based on a parameter specified to the adapter operator 430, for example p_o shown in FIG. 4, the parameter p_o is used to hash $SH_{ab}$ into $SH_{abo}$, then, the generated $SH_{abo}$ may be sent to an immediate downstream party.

In step 360, after the message has been processed in the current party O, the processed message may be encrypted with public key of the immediate downstream party, and then, the encrypted message may be sent to the immediate downstream party, for example, if the immediate downstream party is party D in FIG. 4, then the encrypted message sent to D is $E(msg, pubK_{abo})$.

In a further implement, in a similar way with steps 370-380, if the current party O acquired signed message, i.e. $sign(msg, privK_a)$, from upstream party B 420, the authenticity of the signed message may be verified with the public key $pubK_a$. If the signature is illegal, party O will sound an alarm, and if it is valid, party O will do regular process.

It should also be noted that, in some alternative implementations, party O 430 may be omitted, especially for the scenario of all the end devices may come from one manufactory, then, there will be no need to use adapter operator as an interface between APP and device cloud, that is, APP or APP backend may be connected to the device cloud directly.

In a third embodiment, the current party may be implemented as device cloud 440, denoted by D in FIG. 4, which has an upstream party O 430 as described above, and this embodiment may also take multiple steps in a similar manner with the second embodiment to generate $E(msg, pubK_{abdo})$ and $sign(msg, privK_{abo})$ for a downstream party based on information from upstream party and the method of FIG. 3.

It should also be noted that, in some alternative implementations, as described above, in the scenario of party O 430 omitted for the reason of all the end devices come from one manufactory, the APP backend party B 420 may be implemented as the upstream party and connected with the current party O 430 directly.

To make the specification more concise, it is not necessary to explain the process of each specified current party in detail, that is, the skilled person in the art would know how to apply the method of FIG. 3 to a specific current party.

In a forth embodiment, a gateway G 450 may be included in the system and the gateway 450 may be implemented as the current party, which has an upstream party D 440 as described above.

The message may be decrypted from the encrypted message $Eg(privK_{abod}, SH_{abod})$ prestored in party G according to private key $privK_{abod}$, which is recovered in a similar way with the third embodiment, of the immediate upstream party D, for processing at the current party.

In a further implement, if the current party G 450 acquired signed message from the upstream party D 440, the authenticity of signed message may be verified by the public key of upstream party $pubK_{abo}$. If the signature is illegal, the current party G 450 will sound the alarm, and if it is valid, gateway G 450 will send the verified message to end device for further processing.

As party G 450 usually be connected with the end device 460, denoted by S in FIG. 4, there is no need to further generate encrypted message or signed message continuously, that is, the message decrypted may be processed and resulting in a processed message, which may be sent to end device for execution, for example, to control the end device.

Figure 5:
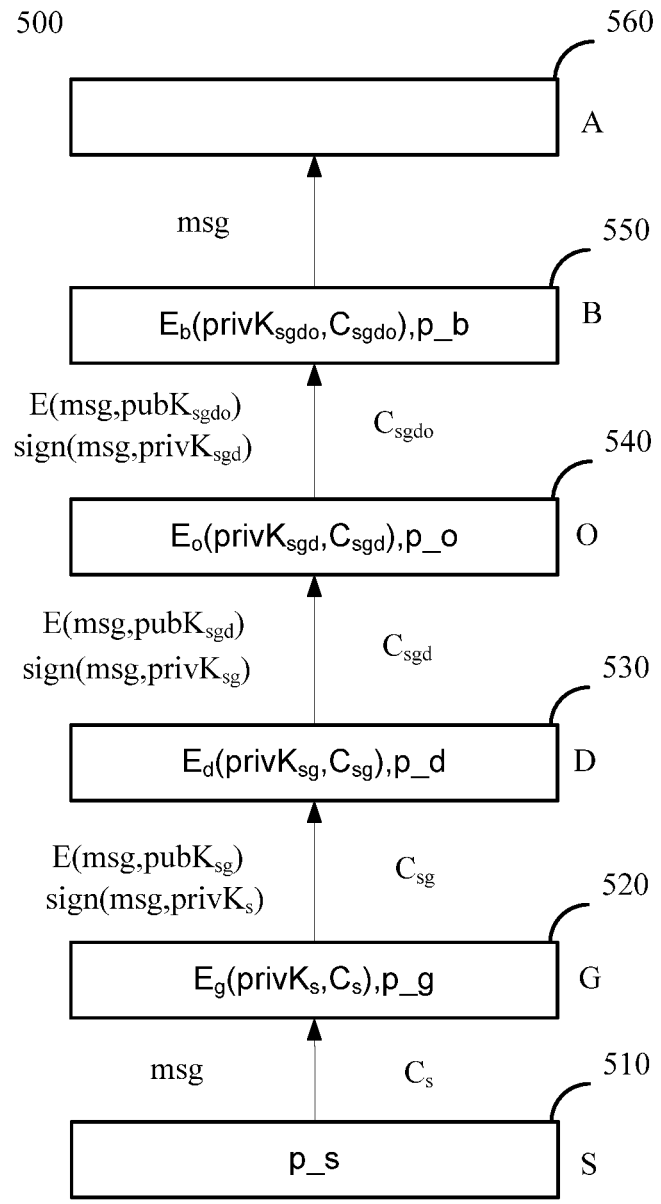
FIG. 5 Shows an example diagram for sending message upward in accordance with embodiments of the present disclosure.

FIG. 5 show another example diagram 500 for sending message upward in accordance with embodiments of the present disclosure. That is, in this embodiment, the information may be sent from end device to user, in which, the upstream party is closer to the end device compared with the downstream party. In this embodiment, different symbols may be used in FIG. 5, however, the method described in FIG. 3 may be also applied to this embodiment accordingly. Now, the specific exemplary embodiments will be described in details with reference to another 4 embodiments corresponding to 4 different given current party respectively.

In a fifth embodiment, the current party in FIG. 3 may be implement by the gateway 520, denoted by G in FIG. 5, and the immediate upstream party is the end device 510. In an exemplary embodiment, the end device may be at least one sensor, denoted by S in FIG. 5. In this embodiment, the steps 310-360 in FIG. 3 may be applied to the specified current party S 510 and be implemented as below:

In step 310, the current party G 520 acquired the first transformed PWD $C_s$ from the immediate upstream party S 510. In one embodiment, each sensor may have a specified parameter used for generating the first transformed PWD, for example $C_s$ shown in FIG. 5.

In another embodiment, the $C_s$ may be a password stored in S in advance. It is to be noted that, the end device sensor S usually being located after the gateway G, it is safe to store $C_s$ directly. When need to send message from sensor S to gateway G, $C_s$ may be sent directly to gateway for decrypt $privK_s$ in the current party G.

In step 320, the encrypted message may be acquired, at the current party G, from the immediate upstream party S 510, in which, the message may be data generated or collected by the end device S.

In step 320, $privK_s$ may be recovered according to the acquired $C_s$, the $privK_s$ represent private key of the immediate upstream party S 510. As described above, $privK_s$ has been encrypted with $C_s$ and stored in party G 520 in advance, so long as $C_s$ is acquired, $privK_s$ may be recovered.

In step 330, decrypting the message from the encrypted message according to the recovered private key $privK_s$ of the immediate upstream party S for processing at the current party G.

In step 340, a transformed PWD $C_{sg}$ may be generated as the second transformed PWD, at the current party G, for the immediate downstream party, that is, $C_{sg}$ is also derived from $C_s$ based on a parameter specified to gateway G, in one example, the parameter is used to hash $C_s$ into $C_{sg}$, then, the generated $C_{sg}$ will be sent to immediate downstream party.

In step 350, after the message has been processed in the current party G, the processed message may be encrypted with public key of the immediate downstream party: $E(msg, privK_{sg})$, and then, the encrypted message may be sent to the immediate downstream party.

In step 360, in a further embodiment, the gateway G 520 may also sign the processed message to ensure that the processed message is really send from the end device S, the detailed sign step may be described as below:

In a further embodiment, step 370 and 380 may be included for signing operation also. To be specific, the gateway G 520 may generate signed message, i.e. $sign(msg, privK_s)$, which is signed with $privK_s$, to ensure that the message is really come from sensor S.

In step 380, sending the generated signed message to immediate downstream party, for example the cloud device D, for the party D verify the authenticity of the signed message.

In a sixth embodiment, the current party may be the cloud device 530, denoted by D in FIG. 5. Then the immediate upstream party may be the gateway 520, denoted by G in FIG. 5. Party D 530 may also have a specified parameters p_d to transform the acquired $C_{sg}$ into transformed PWD, for example $CS_{sgd}$, in a similar way, the steps 310-360 in FIG. 3 may be applied to the specified current party and implemented as below:

In step 310, the current party D acquired $C_{sg}$ as the first transformed PWD from the immediate upstream party G.

In step 320, acquired, from the immediate upstream party G, encrypted message: $E(msg, pubK_{sg})$, which represent that the message is encrypted with public key of the immediate upstream party G.

In step 330, $PrivK_{sg}$ may be recovered according to the first transformed PWD, in which, the $privK_{sg}$ represent private key of the immediate upstream party G. As described above, $privK_{sg}$ has been encrypted with $C_{sg}$ and stored in party D as shown in 530, so long as $C_{sg}$ is acquired, $privK_{sg}$ will be recovered accordingly.

In step 340, the message may be decrypted from the encrypted message $E(msg, pubK_{sg})$ according to the recovered private key $privK_{sg}$ of the immediate upstream party G for processing at the current party D.

In step 350, A transformed PWD $C_{sgd}$ may be generated as the second transformed PWD, at the current party D, for the immediate downstream party, that is, $C_{sgd}$ is also derived from $C_s$ based on a parameter specified to the device cloud, for example p_d in FIG. 5, the parameter is used to hash $C_{sg}$ into $C_{sgd}$, then, the generated $C_{sgd}$ will be sent to immediate downstream party.

In step 360, After the message has been processed in the current party D, the processed message may be encrypted with public key of the immediate downstream party, and then, the encrypted message may be sent to the immediate downstream party, for example, if the immediate downstream party is party O 540 in FIG. 5, then the encrypted message sent to party O 540 is $E(msg, pubK_{sgd})$.

In a further implement, if the current party D acquired signed message from upstream party, for example, if the upstream party is party G, then the signed message may be $sign(msg, privK_s)$ and the signed message will be verified with the public key $pubK_s$. If the signature is illegal, D will sound the alarm, and if it is valid, D will do a similar process as G does.

The current party may be implemented as Adapter Operator 540 or APP backend 550, denoted by O or B respectively in FIG. 5. For example, if the current party is implemented as Adapter Operator 540, then party O 540 may generate $E(msg, pubK_{sgdo})$ and $sign(msg, privK_{sgd})$ for a downstream party A 560 based on information from upstream party and method of FIG. 3. To make the specification more concise, no need to explain the process of each specified current party in detail, that is to say, the skilled person in the art would know how to apply the method of FIG. 3 on a specific current party selected.

Now some exemplary embodiments will be described with reference to FIG. 6, FIG. 7 and FIG. 8 to show how the private key chain and the encryption key chain may be generated automatically.

Figure 6:
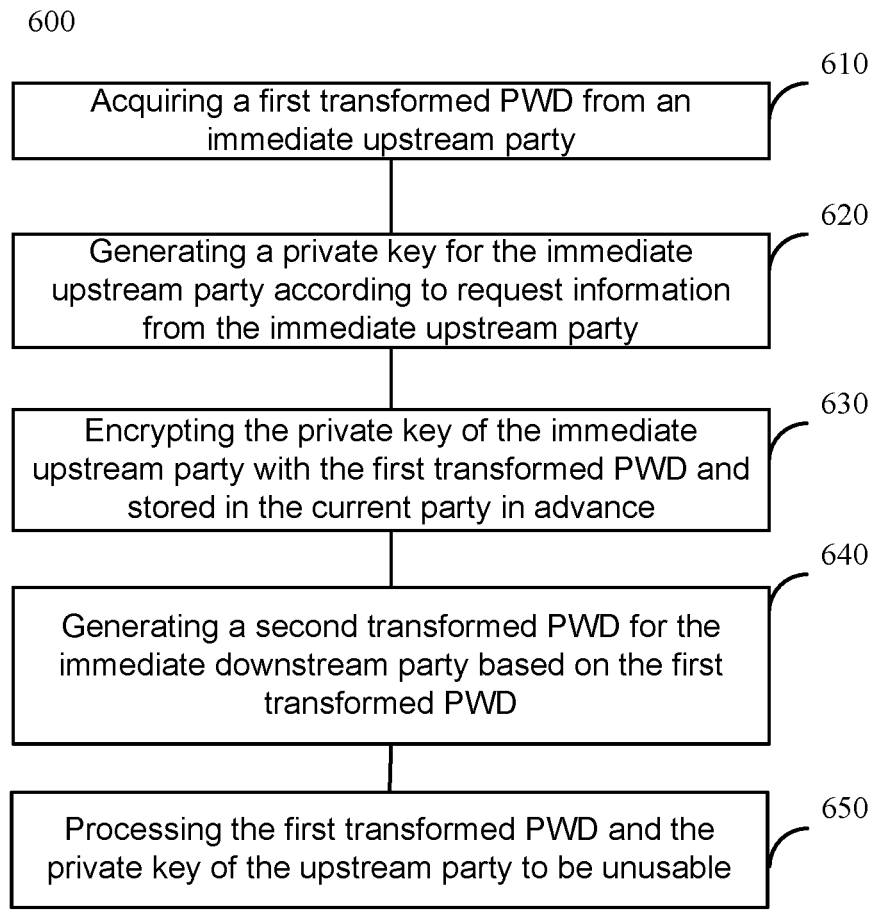
FIG. 6 shows a flow diagram of a computer-implemented method used in a current party for preparing the private key in accordance with exemplary embodiments of the present disclosure.

FIG. 6 shows a flow diagram 600 of a computer-implemented method 600 used in a current party for preparing the private key in accordance with exemplary embodiments of the present disclosure. That is, the method 600 is an initialization process for preparing the private key of the immediate upstream party being encrypted with the first transformed PWD and being stored in the current party in advance, the initialization process start from step 610.

In step 610, a first transformed PWD may be acquired from an immediate upstream party, the transformed PWD is derived from an original PWD.

In one example, when a user want to send a control message, the user may input the PWD for authenticating, and the first transformed PWD may be calculated in real time based on the PWD inputted in real time.

In step 620, a private key for the immediate upstream party may be generated according to a request associated with a user from the immediate upstream party.

In one embodiment, ECKey may be used for generating a private key for the immediate upstream party. It should be noted that, ECKey is generated by an existing cryptography method called Elliptic Curve(EC) that provided by OpenSSL, other kinds of private key generating methods may also be used, such as RSA, DSA, Diffie-Hellman key, etc.

In step 630, the private key of the immediate upstream party may be encrypted with the first transformed PWD and stored in the current party in advance.

In step 640, a second transformed PWD for the immediate downstream party may be generated based on the first transformed PWD.

In step 650, the first transformed PWD and the private key of the immediate upstream party may be processed to be unusable. In one embodiment, via the dumping operation, no party will store the cleartext of private key and transformed PWD, therefore, no one can recover the private key or the transformed PWD by just cracking the database of any party. In another embodiment, the first transformed PWD and the private key may be encrypted with a random number and made them unusable. Other kind of processing may be applied, if only the processed private key and the transformed PWD becomes unusable.

Figure 7:
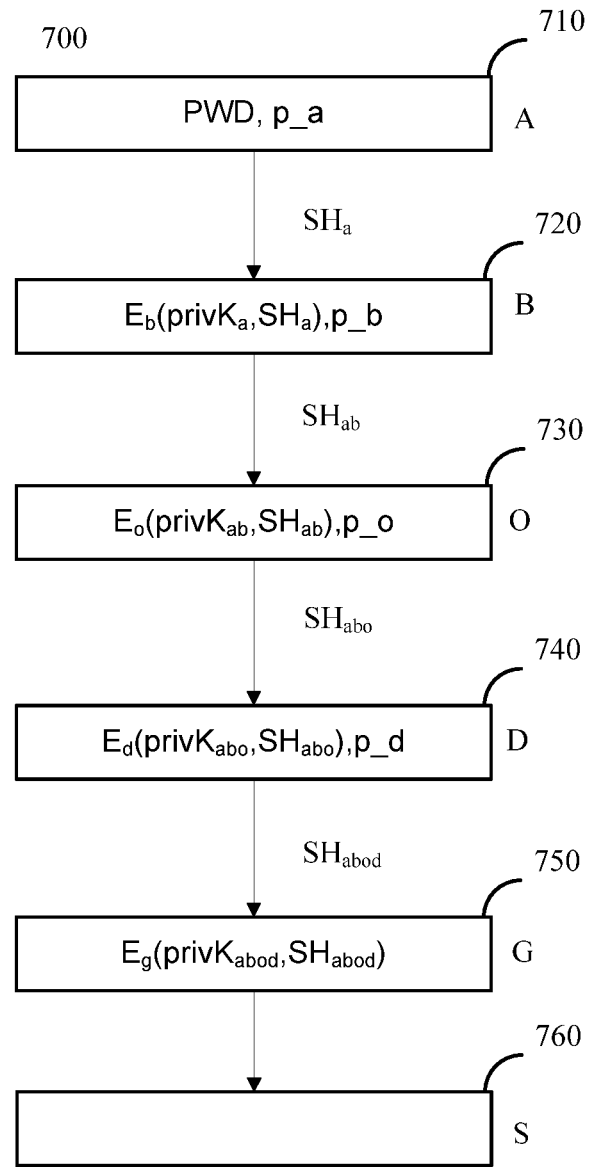
FIG. 7 shows an example diagram for initializing downward in accordance with embodiments of the present disclosure.

FIG. 7 shows an example diagram 700 for initializing downward in accordance with embodiments of the present disclosure, in which, "initializing downward" means that the initialization is from users to end devices.

By applying the method of FIG. 6 to each node in FIG. 7, the encryption parameters and the private keys may be generated automatically, below, how the method of FIG. 6 applying to each party may be described one by one.

In one embodiment, the current party may be the APP backend B 720 shown in FIG. 7, the immediate upstream party may be party A 710, the downstream party may be party O 730.

Then the step 610 of FIG. 6 may be implemented by acquiring $SH_a$ as the first transformed PWD from the immediate upstream party B 720, the first transformed PWD being derived from an original PWD created for a user.

In one embodiment, in response to a request for registration from user "a", a password associated with the specific user "a" may be created and slow hashed into $SH_a$ by party A 710. In this embodiment, an encryption parameter may be generated for slow hashing the password into $SH_a$, for example p_a, which is an encryption parameter only known to party A. Party A 410 may stores the encryption parameter s p_a for further slow hashing operation in the future. In one exemplary embodiment, the encryption parameter is salt, which is a random data that is used as an additional input to a one-way function that "hashes" a password the salt value is used to safeguard passwords in storage. Using the encryption parameter p_a, an asymmetric transformation, such as call a hash function, is applied to that password, and thus, $SH_a$ may be generated as the first transformed PWD and sent to the current party B 720, as shown in FIG. 7.

And then, the transformed $SH_a$ may be sent to the current party B 720 as the first transformed PWD.

In one embodiment, if there are multiple users, then for each user, a password may be generated, for example, a password may be generated at APP1 for a specific user "Lucy". Details will be described with reference to FIG. 8.

The step 620 may be implemented as creating a private key $privK_a$, for example in the form of ECKey, for each user "a", according to request information from the immediate upstream party, that is applications used by users.

It should be noted that, ECKey is generated by an existing cryptography method called Elliptic Curve(EC) that provided by OpenSSL, other kinds of private key generating methods may also be used, such as RSA, DSA, Diffie-Hellman key, etc.

The step 630 may be implemented as encrypting the private key $privK_a$ of the immediate upstream party A with the first transformed PWD $SH_a$ and storing the encrypted private key in the current party in advance.

The step 640 may be implemented as generating a second transformed PWD $SH_{ab}$ for the immediate downstream party O based on the first transformed PWD $SH_a$ and parameter p_b only known to B.

The step 650 may be implemented as dumping the cleartext private key $privK_a$ of the immediate upstream party as well as the first transformed PWD Continuing this, take party O 730 as the current party, take party B 720 as the immediate upstream party, and take party D 740 as the immediate downstream party, and then the method of FIG. 6 may be applied to party O, as shown in FIG. 7. $SH_{ab}$ may be acquired as the first transformed PWD from the immediate upstream party B 720, and the second transformed password $SH_{abo}$ may be generated based on $SH_{ab}$ and a parameter p_o only known to the current party O 730, which may be sent to an immediate downstream party of current party O, such as party D 740 as shown in FIG. 7.

In this embodiment, a private key $privK_{ab}$ may be generated at the current party O 730 according to request information from the immediate upstream party, for example, the request information may be comprising information about a specific user and a specific chain from the user to the immediate upstream party B, and then, the $privK_{ab}$ may be symmetrically encrypted with $SH_{ab}$, that is the $E_o(privK_{ab}, SH_{ab})$ stored in party O 730 in advance.

Similar with previous party B, party D 740 may generate transformed password $SH_{abod}$ based on $SH_{abo}$ acquired from immediate upstream party O 730 and parameter p_d known only to party D, and the encrypted message $E_o(privK_{abo}, SH_{abo})$ may be generated and stored in party D 740 in advance. And then dumps the cleartext $privK_{abo}$ as well as $SH_{abo}$.

Regarding party G 750 as the current party, since sensor S 760 is the immediate downstream party of party G 750 and sensor S 760 is the end device, no need to further generate a second transformed password for the end device S 760. However, the encrypted message $E_g(privK_{abod}, SH_{abod})$ still need to be generated and stored in party G 750 in advance. And then, the cleartext $privK_{abod}$ as well as $SH_{abod}$ may be dumped.

And thus, through the initialization described above, each party may have an associated encryption parameter for generating transformed password and have a private key stored for the previous node.

Figure 8:
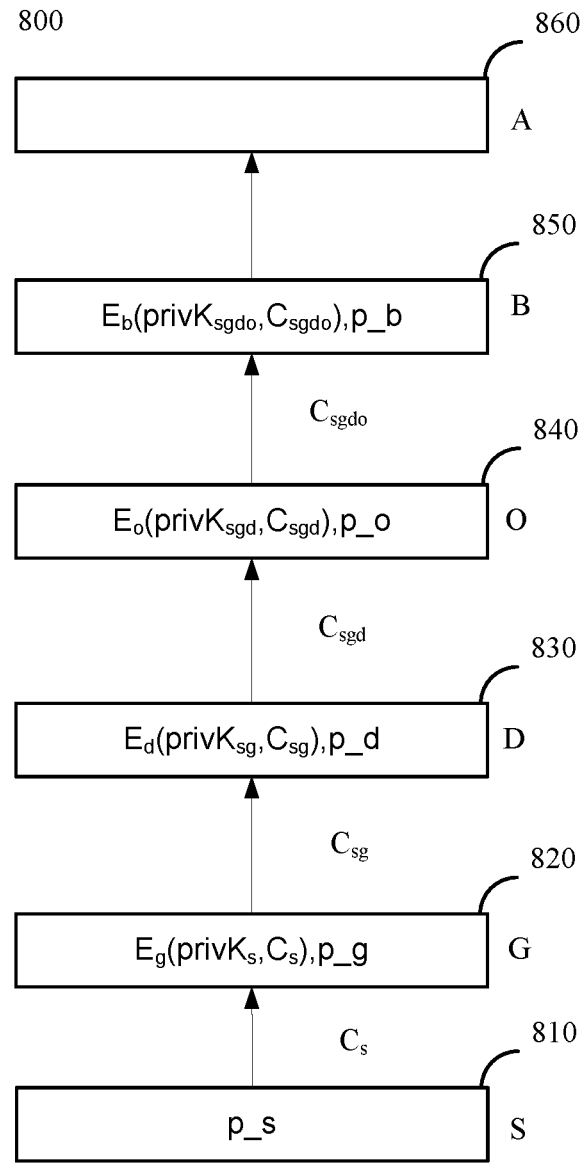
FIG. 8 shows an example diagram for initializing upward in accordance with embodiments of the present disclosure.

FIG. 8 shows an example diagram 800 for initializing upward in accordance with embodiments of the present disclosure, in which, "upward" means that the message is transferred from end device to end users.

By applying the method of FIG. 6, for each party, the encryption parameters and the private key are generated as illustrated in FIG. 8 as shall be described one by one as below.

In one embodiment, the current party may be the gateway G 820 shown in FIG. 8, the immediate upstream party may be party S 810, the downstream party may be party D 830.

Then the step 610 of FIG. 6 may be implemented as acquiring $C_s$ as the first transformed PWD from the immediate upstream party S 810. In one embodiment, the end device may be a sensor, that is the sensor S 810 in FIG. 8, the sensor S may be paired with a gateway G 820 by a user in the initialization.

Next, step 620 of FIG. 6 may be implemented as generating a private key $privK_s$ for the sensor S.

Then, step 630 of FIG. 6 may be implemented as encrypting $privK_s$ with the generated cipher $C_s$, that is, $E_g(privK_s, C_s)$ stored at the gateway G 820 as shown in FIG. 8.

Then, step 640 of FIG. 6 may be implemented as generating a new cypher $C_{sg}$ as the second transformed PWD for the pair (s, g) based on $C_s$ and p_g.

And then, step 650 of FIG. 6 may be implemented as dumping the cleartext $privK_s$ and $C_s$.

To make the specification more concise, no need to explain the process of each specified current party in detail, that is, the skilled person in the art would know how to apply the method of FIG. 6 on a specific current party selected, just as the description corresponding to the implementation of taking party G as the current party.

Take party D 830 as the current party, party G 820 as the immediate upstream party, and take party O 840 as the immediate downstream party. Party D may generate a new private key $privK_{sg}$ according to a request form party G, and encrypted the private key with the cipher $C_{sg}$ acquired from party G, that is the Ed $(privK_{sg}, C_{sg})$ as shown in FIG. 8. Party D may also generate a new cypher $C_{sgd}$ for the tuple (s, g, d) based on $C_{sg}$ acquired from party G, and $C_{sgd}$ may be sent to an immediate downstream party, for example party O. Then the cleartext ECKey privK$_{sg}$ and $C_{sg}$ may be dumped.

Similar with previous party D, party O may be implemented as the current party. In this embodiment, party O may generate a new ECKey and encrypted the private key with the cipher $C_{sgd}$ acquired from party D 830, that is the $E_o$ (privK$_{sgd}$, $C_{sgd}$) as shown in FIG. 8. Then the cleartext ECKey privK$_{sgd}$ and $C_{sgd}$ may be dumped. Party O may also generate a new cypher $C_{sgdo}$ for the tuple (s, g, d, o) based on $C_{sgd}$ acquired from party D and the parameters p_o known only to party O 840, and $C_{sgdo}$ may be sent to an immediate downstream party, for example party B 850.

And then, in a similar way, party B 850 be implemented as the current party. In this embodiment, party B may generate a new ECKey privK$_{sgdo}$ and encrypted the private key with the cipher $C_{sgdo}$ acquired from party O 830, that is, the encrypted message $E_b$(privK$_{sgdo}$, $C_{sgdo}$) may be stored in 850 in advance, just as shown in FIG. 8. And then, the cleartext privK$_{sgdo}$ as well as $C_{sgdo}$ may be dumped. However, since the application A 860 is the immediate downstream party of party O 850 and party A 860 is the user, no need to further generate a second transformed password for party A860.

And thus, through the initialization described above, the encryption parameters and the private keys may be generated and stored in advance automatically for each specific party in a multilayer system.

Meanwhile, all the public keys may be broadcasted to every party for them to verify the signatures with private keys. All the parties in this example will dump transformed PWD such that no one can recover it from the disk by hacking into each party.

Figure 9:
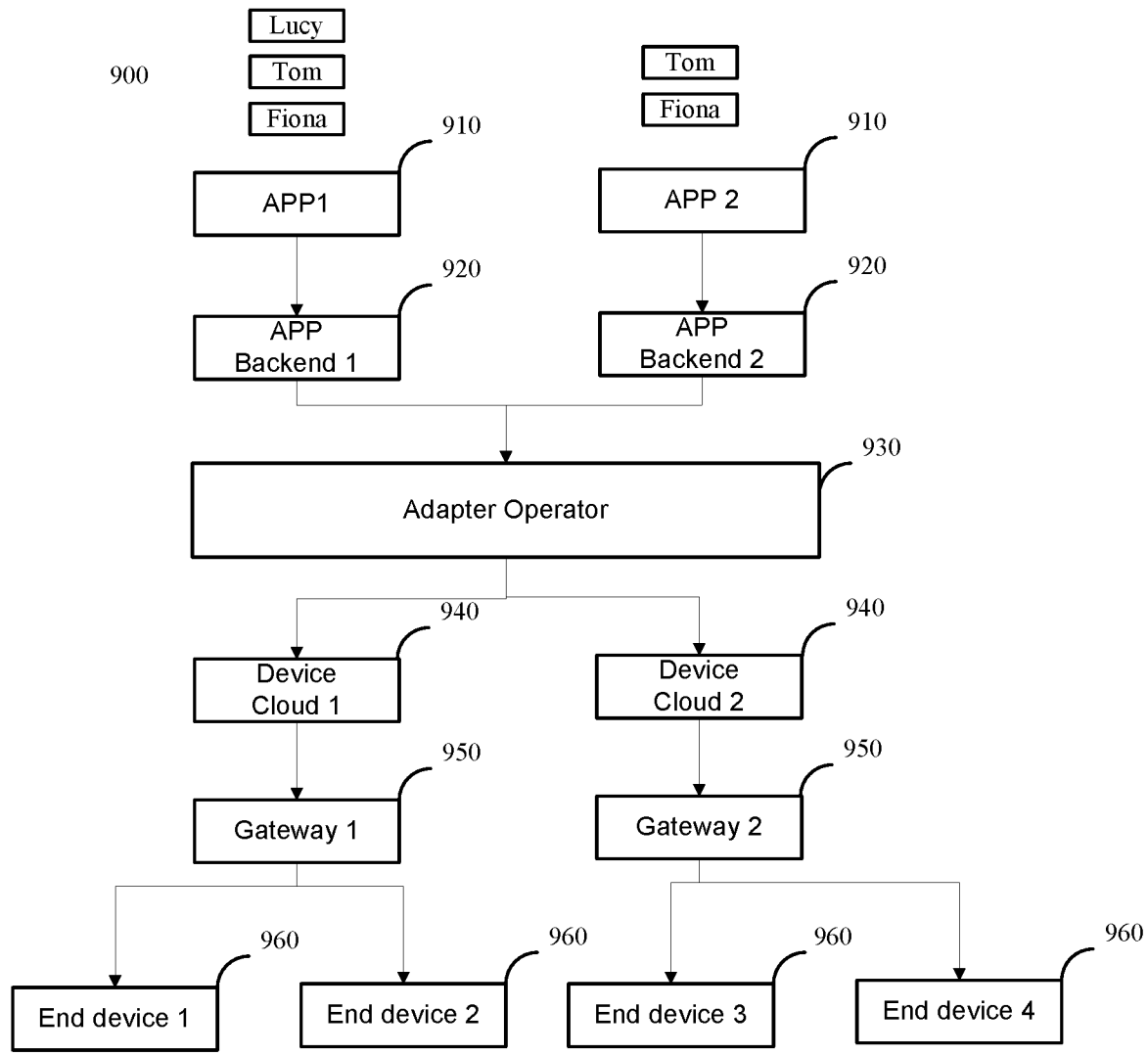
FIG. 9 shows another example of generating private keys in accordance with exemplary of the present disclosure.

FIG. 9 shows another example diagram 900 for generating private keys in accordance with an embodiment of the present disclosure.

In this embodiment, for each layer of the multilayer system, at least one party may be included. Then, the process described above may be implemented for each chain from a specific user "a" to a specific end device "s". Even though the topology may be complicated for the embodiment of FIG. 9, for each specific chain, the initialization and message sending process is substantially the same as the embodiment of each layer only one party included, and both the method of FIG. 3 and FIG. 6 may be applied.

Taking FIG. 9 as an example, multiple APPs 910, such as APP1 and APP2, may be included in APP layer and used by multiple users "a", such as Lucy, Tom and Fiona. To be specific, APP1 may be used by Lucy, Tom and Fiona, and APP2 may be used by Tom and Fiona as shown by FIG. 9.

In one embodiment, multiple APP backends 920, such as APP backend 1 and APP backend 2, may be included in APP backend layer, and then, a private key and public key may be generated for each APP user "a" at each APP backend, in which, each private key may be encrypted with a specific transformed password SH$_a$ and prestored at a corresponding APP backend, that is, the encrypted private keys for Lucy, Tom, and Fiona may be stored at APP backend 1 with a transformed password SH$_a$ specific with a specific user, for example, SH$_{Lucy}$ may be used for prestore private keys of user Lucy at APP backend 1. In the same way, the encrypted private keys for Tom and Fiona may be stored at APP backend 2 respectively. For each APP backend in the APP backend layer, SH$_{ab}$ may be generated based on SH$_a$ and p_b, the generated SH$_{ab}$ may be sent to one downstream party, for example adapter operator 930.

In one embodiment, at least one adapter operator 930 may be included, the adapter operator 930 may generate a private key for each (a, b) pair. In a further embodiment, since there are multiple users and multiple APPs, multiple private keys may be generated for each specified (a,b) pair. Each of the pair includes a specified user and a specified APP backend. For example, "Lucy-B1" means a pair of a specified user "Lucy" and a specified backend "B1". And then, encrypted private keys for Lucy-B1, Tom-B1, Fiona-B1, Tom-B2, Fiona-B2 may be stored in adapter operator 930, the immediate downstream party. The adapter operator 930 may generates another slow hash SH$_{abo}$ based on SH$_{ab}$.

In one embodiment, multiple device clouds 840, such as device cloud D1 and device cloud D2, may be included in device cloud D layer, and at each device cloud, an ECKey may be generated for a specific (a, b, o) tuple and encrypted with a specific SH$_{abo}$ correspondingly.

To be specific, for device cloud D1, the encrypted private keys generated for Lucy-B1-O, Tom-B1-O, Fiona-B1-O, Tom-B2-O, Fiona-B2-O may be stored in advance. And for Device cloud D2. the encrypted private keys for (Lucy-B1-O)', (Tom-B1-O)', (Fiona-B1-O)', (Tom-B2-O)', (Fiona-B2-O)' may be stored in advance.

Further, Party D1 940 may generate another slow hash SHabod based on SHabo and an encryption parameter p_d associated with a specified device cloud.

In one embodiment, multiple gateways 950, such as gateway 1 and gateway 2, communicating with end devices 960, may be included in gateway layer as shown in FIG. 9, and then, at each party in layer gateway, an ECKey may be generated for a specific (a, b, o, d) tuple.

To be specific, Gateway 1 is one party in layer gateway, multiple private keys may be generated by the gateway 1 for four specific (a, b, o, d) tuple, that is, Lucy-B1-O-D1, Tom-B1-O-D1, Fiona-B1-O-D1, Tom-B2-O-D1, Fiona-B2-O-D1. Each generated private key may be encrypted with a specific slow hash SH$_{abod}$ and stored in the corresponding gateway 1.

Similarly, gateway 2 is another party in layer G, encrypted private keys may be generated for another four specific (a, b, o, d) tuple, that is, Lucy-B1-O-D1, Tom-B1-O-D1, Fiona-B1-O-D1. There are no tuples containing B2 as backend, because gateway 2 only connected to the devices concerned by APP 1. Like the case for gateway 1, each generated private key may be encrypted with a specific slow hash SH$_{abod}$ and stored in the corresponding gateway 2.

As described above, the present invention ensures the security by allowing the second node in the chain to store the private key of its precedent node, that is the first node. Especially, those stored private keys are encrypted with parameters that are only known to the precedent nodes, and the parameters are sent to the next nodes only when the precedent nodes want to send a message. Moreover, by using the method of present invention, it is ensured that no parties can fake the signature of its precedent nodes, while automatically triggering the transmission of message almost without human interference.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
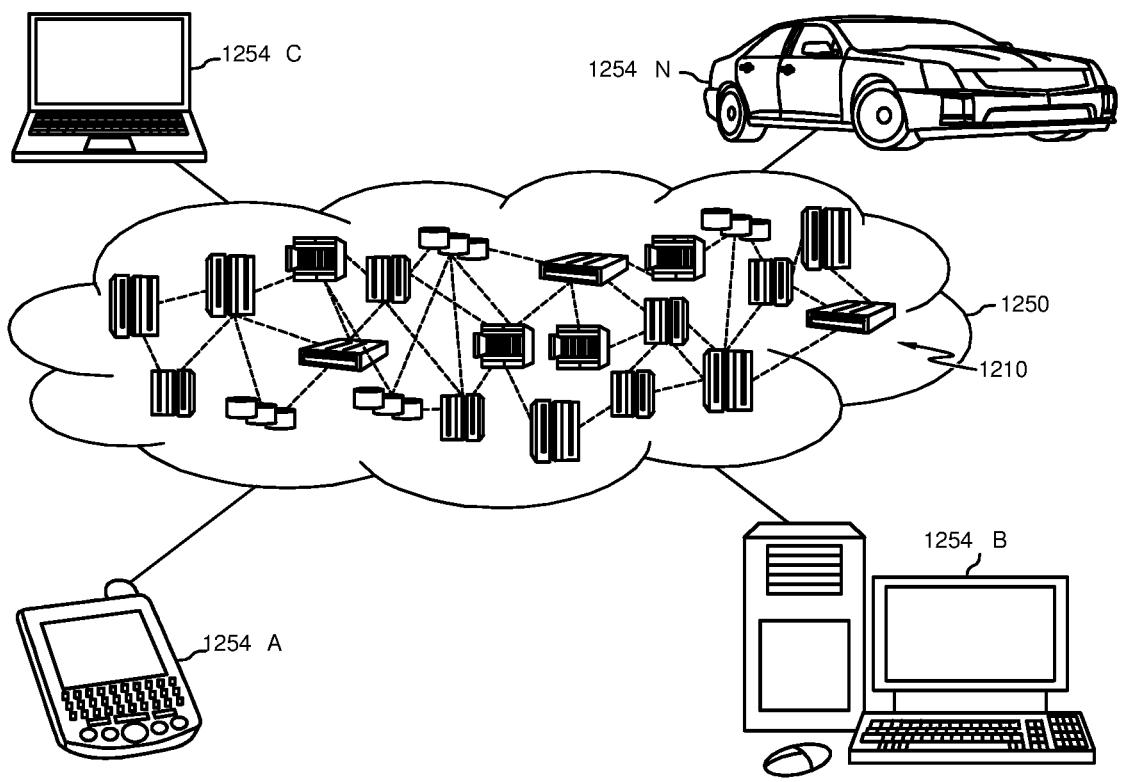
FIG. 10 is a functional block diagram depicting a cloud computing environment according to an embodiment of the present invention.

Referring now to FIG. 10, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 10 are intended to be illustrative only and that computing nodes 1210 and cloud computing environment 1250 can communicate with any type of computerized device over any type of network and/or network addressable connection (e.g., using a web browser).

Figure 11:
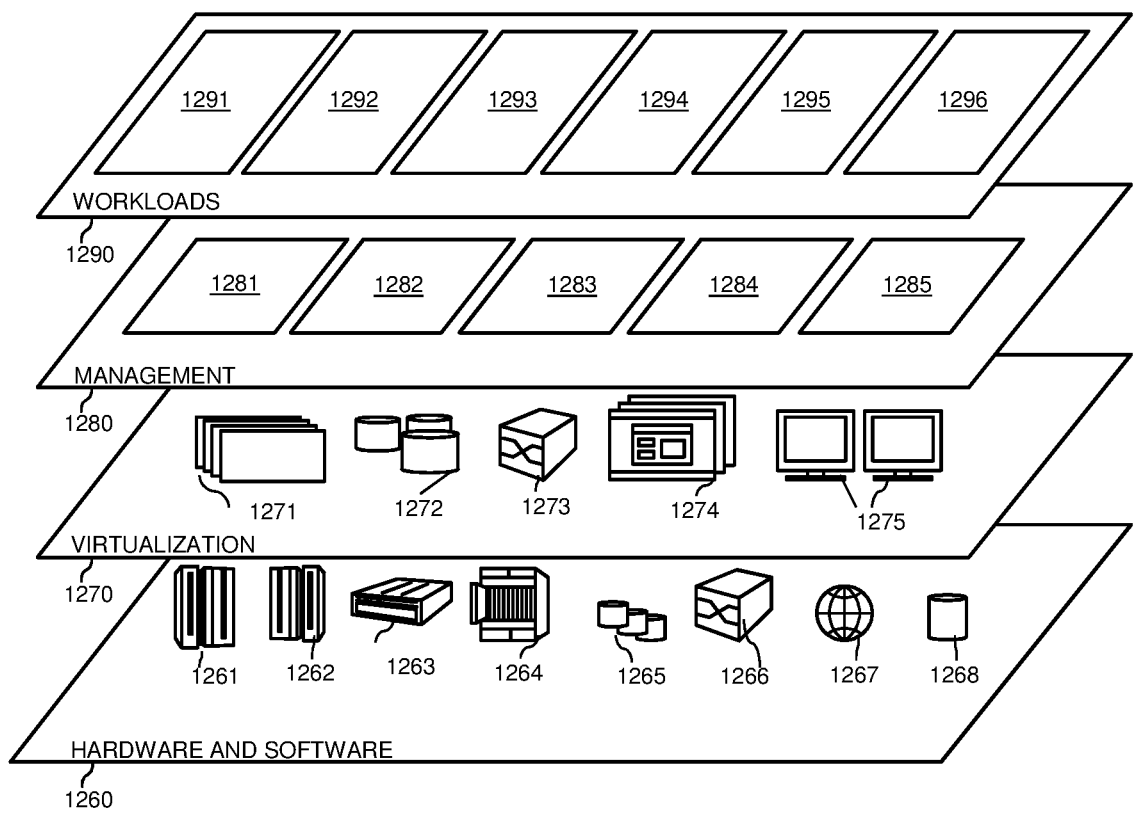
FIG. 11 is a diagram depicting abstraction model layers according to an embodiment of the present invention.

Referring now to FIG. 11, a set of functional abstraction layers provided by cloud computing environment 1250 (FIG. 10) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and sending a message in a multilayer system or environment including authentication 1296.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented data transmission method executed at a second node, wherein the second node is communicatively connected to a first node, the method comprising:
   acquiring a first transformed password (PWD) from the first node, wherein the first transformed PWD is derived from an original PWD;
   acquiring an encrypted message from the first node, the encrypted message being encrypted with a public key of the first node;
   recovering a private key of the first node according to the first transformed PWD, the private key having been encrypted with the first transformed PWD and stored in the second node in advance of recovering the private key;
   decrypting the encrypted message with the recovered private key to obtain a decrypted message for processing; and
   dumping the private key from the first node and the first transformed PWD.

2. The method of claim 1, wherein the second node is communicatively connected to a third node, the method further comprising:
   processing the decrypted message resulting in a processed message; and
   sending an encrypted processed message to the third node, wherein the encrypted processed message is the processed message encrypted with a public key of the second node.

3. The method of claim 2, further comprising:
   generating a second transformed PWD for the third node based on the first transformed PWD.

4. The method of claim 2, further comprising:
   generating a signed message that is the decrypted message signed with the private key of the first node; and
   sending the signed message to the third node for verifying authenticity of the signed message.

5. The method of claim 1, wherein the private key is prepared by a process executed before acquiring the first transformed PWD from the first node, the process comprising:
   generating the private key for the first node according to information in a request from the first node;
   encrypting the private key of the first node with the first transformed PWD and storing the encrypted private key in the second node;
   generating a second transformed PWD for a third node based on the first transformed PWD; and
   processing the first transformed PWD and the private key to be unusable.

6. The method of claim 3, wherein,
   the first transformed PWD is derived from the original PWD based on a first encryption parameter associated with the first node; and
   the second transformed PWD is derived from the first transformed PWD based on a second encryption parameter associated with the second node.

7. The method of claim 1, wherein a multilayer system comprises a chain of multiple nodes consisting of, an application, an application backend, an adaptor operator, a device cloud, a gateway and an end device communicatively connected sequentially; and the second node is any one of the application backend, the adaptor operator, the device cloud, the gateway.

8. The method of claim 1, wherein the first node is an application backend that hosts an application used by a user, and the original PWD is inputted by the user in real time via the application.

9. The method of claim 7, wherein the second node is the gateway and the first node is the device cloud, the method comprising:
   processing the decrypted message resulting in a processed message; and
   sending the processed message to a third node for execution, wherein the third node is the end device.

10. The method of claim 7, wherein the first node is the end device, and the original PWD is associated with the end device and is stored in the end device.

11. A computer program product being tangibly stored on a non-transient machine-readable medium and comprising machine-executable instructions, the instructions, when executed on a second node, wherein the second node is communicatively connected to a first node, performing acts including:
   acquiring a first transformed password (PWD) from the first node, wherein the first transformed PWD is derived from an original PWD;
   acquiring an encrypted message from the first node, the encrypted message being encrypted with a public key of the first node;
   recovering a private key of the first node according to the first transformed PWD, the private key having been encrypted with the first transformed PWD and stored in the second node in advance of recovering the private key;
   decrypting the encrypted message with the recovered private key to obtain a decrypted message for processing; and
   dumping the private key from the first node and the first transformed PWD.

12. The computer program product of claim 11, wherein the second node is communicatively connected to a third node, the acts further comprising:
- processing the decrypted message resulting in a processed message; and
- sending the encrypted processed message to the third node, wherein the encrypted processed message is the processed message encrypted with a public key of the second node.

13. The computer program product of claim 11, the acts further comprising:
- generating a second transformed PWD for a third node based on the first transformed PWD.

14. The computer program product of claim 11, the acts further comprising:
- generating a signed message that is the decrypted message signed with the private key of the first node; and
- sending the signed message to a third node for verifying authenticity of the signed message.

15. The computer program product of claim 11, wherein the private key is prepared by a process executed before acquiring the first transformed PWD from the first node, the process comprising:
- generating the private key for the first node according to information in a request from the first node;
- encrypting the private key of the first node with the first transformed PWD and storing the encrypted private key in the second node;
- generating a second transformed PWD for a third node based on the first transformed PWD; and
- processing the first transformed PWD and the private key to be unusable.

16. The computer program product of claim 12, wherein, the first transformed PWD is derived from the original PWD based on a first encryption parameter associated with the first node; and
a second transformed PWD is derived from the first transformed PWD based on a second encryption parameter associated with the second node.

17. A computer system, which is a second node that being communicatively connected to a first node, the system comprising:
- a processor;
- a computer-readable memory coupled to the processor, the memory comprising instructions that when executed by the processor perform actions of:
  - acquiring a first transformed password (PWD) from the first node, wherein the first transformed PWD is derived from an original PWD;
  - acquiring an encrypted message from the first node, the encrypted message being encrypted with a public key of the first node;
  - recovering a private key of the first node according to the first transformed PWD, the private key having been encrypted with the first transformed PWD and stored in the second node in advance of recovering the private key;
  - decrypting the encrypted message with the recovered private key to obtain a decrypted message for processing; and
  - dumping the private key from the first node and the first transformed PWD.

18. The computer system of claim 17, wherein the second node is communicatively connected to a third node, the actions further comprising:
- processing the decrypted message resulting in a processed message; and
- sending the encrypted processed message to the third node, wherein the encrypted processed message is the processed message encrypted with a public key of the second node.

19. The computer system of claim 18, the actions further comprising:
- generating a signed message that is the decrypted message signed with the private key of the first node;
- generating a second transformed PWD for the third node based on the first transformed PWD; and
- sending the signed message to the third node for verifying authenticity of the signed message.

20. The computer system of claim 17, wherein the private key is prepared by a process executed before acquiring the first transformed PWD from the first node, the process comprising:
- acquiring the first transformed PWD from the first node;
- generating the private key for the first node according to information in a request from the first node;
- encrypting the private key of the first node with the first transformed PWD and storing the encrypted private key in the second node;
- generating a second transformed PWD for a third node based on the first transformed PWD; and
- processing the first transformed PWD and the private key to be unusable.

* * * * *